United States Patent [19]
Goodman

[11] Patent Number: 5,983,170
[45] Date of Patent: Nov. 9, 1999

[54] SYSTEM AND METHOD FOR GENERATING SEMANTIC ANALYSIS OF TEXTUAL INFORMATION

[75] Inventor: Marc I. Goodman, Waltham, Mass.

[73] Assignee: Continuum Software, Inc, Woburn, Mass.

[21] Appl. No.: 08/670,809

[22] Filed: Jun. 25, 1996

[51] Int. Cl.$^6$ .................................................. G06F 17/27
[52] U.S. Cl. .................................................. 704/9
[58] Field of Search ................................. 704/1, 4, 9, 8; 364/975

[56] References Cited

U.S. PATENT DOCUMENTS

| | | | |
|---|---|---|---|
| 5,331,556 | 7/1994 | Black, Jr. et al. | 704/9 |
| 5,361,353 | 11/1994 | Carr et al. | 395/680 |
| 5,414,841 | 5/1995 | Bingham et al. | 707/100 |
| 5,454,106 | 9/1995 | Burns et al. | 704/8 |
| 5,526,443 | 6/1996 | Nakayama | 704/8 |
| 5,680,628 | 10/1997 | Carus et al. | 704/1 |
| 5,708,825 | 1/1998 | Sotomayor | 704/1 |

*Primary Examiner*—David R. Hudspeth
*Assistant Examiner*—Patrick N. Edouard
*Attorney, Agent, or Firm*—Richard A. Jordan

[57] ABSTRACT

A system receives an information stream comprising the textual information whose semantic content is to be determined, divides the information stream into a series of elements and classifies each element into one of a plurality of predetermined classifications. The system includes a token generator and a token classifier. The token generator receives the textual information stream, parses the stream to identifies the respective elements, identifies for each element one of a plurality of element types, and generates a token identifying the element type for each element. At least some of the tokens also include a pointer pointing to the actual information associated with the element. The token classifier receives the tokens and classifies them in order. In that operation, the token classifier classifies each token in relation to the token's type, classifications for previously-classified tokens and the types of successive tokens, thereby to determine the semantic content of the information associated with the tokens. After the tokens are classified, the information associated therewith can be loaded into a database system according to their classifications, and conventional database tools used to obtain information therefrom.

15 Claims, 1 Drawing Sheet

SYSTEM AND METHOD FOR GENERATING SEMANTIC ANALYSIS OF TEXTUAL INFORMATION

FIELD OF THE INVENTION

The invention relates generally to the field of data processing systems, typically for processing digital data, and more particularly to systems and methods for generating semantic analyses of textual information.

BACKGROUND OF THE INVENTION

Digital computer systems have been developed for storing and processing information in a plurality of structured forms. Problems arise, however, when it is desired to process information which can have a variety of structures, such as textual information, to determine its semantic content. Several systems have been developed to enable computers to attempt to process textual information in relatively narrow and limited fields. For example, in some systems, the textual information is scanned to identify key words or their synonyms and their relationships, from which the system attempts to determine the semantic content of the textual information, in response to which the computer may perform some predetermined operation. In other systems, the textual information is parsed using a syntactic grammar, and a parse tree developed. Using the parse tree, the system also attempts to determine the semantic content of the textual information, in response to which the computer may perform some predetermined operation. Both types of systems are generally useful only in connection with textual information of relatively well-defined structure and content, and are difficult and expensive to maintain.

SUMMARY OF THE INVENTION

The invention provides a new and improved system and method for generating a semantic analysis of textual information.

In brief summary, the new system receives an information stream comprising the textual information whose semantic content is to be determined, divides the information stream into a series of elements and classifies each element into one of a plurality of predetermined classifications. The system includes a token generator and a token classifier. The token generator receives the textual information stream, parses the stream to identify the respective elements, identifies for each element one of a plurality of element types, and generates a token identifying the element type for each element. At least some of the tokens also include a pointer pointing to the actual textual information associated with the element. The token classifier receives the tokens and classifies them in order. In that operation, the token classifier classifies each token in relation to the token's type, classifications for previously-classified tokens and the types of previous and successive tokens, thereby to determine the semantic content of the information associated with the tokens. After the tokens are classified, the information associated therewith can be loaded into a database system according to their classifications, and conventional database tools used to obtain information therefrom.

The inventive system can be constructed in whole or in part from special purpose hardware or a general purpose computer system, or any combination thereof, any portion of which may be controlled by a suitable program. Similarly, the inventive method can be performed in whole or in part on special purpose hardware or a general purpose computer system, or any combination thereof, any portion of which may be controlled by a suitable program. In one embodiment, the token classifier comprises a classification tree, but other classification mechanisms can also be used.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
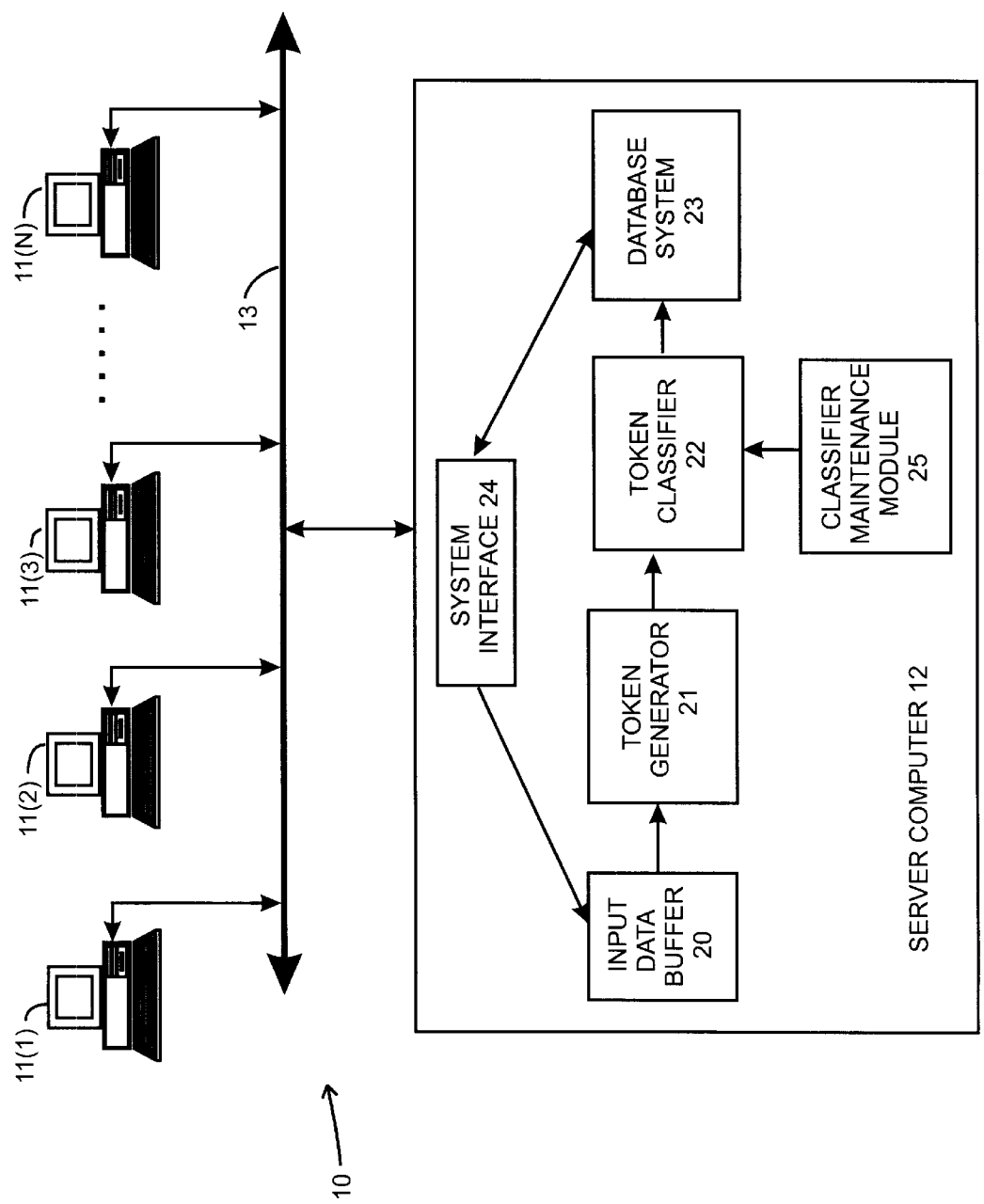
FIG. 1 is a block diagram of a computer network including a system for generating a semantic analysis of textual information, constructed in accordance with the invention.

FIG. 1 depicts a computer network 10 including a system for generating a semantic analysis of textual information, constructed in accordance with the invention. With reference to FIG. 1, network 10 includes a plurality of computers 11(1) through 11(N) (generally identified by reference numeral 11(n)) and 12 which are interconnected by a communication link 13. As is conventional, the computers 11(n) and 12 are of the conventional stored-program computer architecture. At least some of the computers 11(n) are in the form of personal computers or computer workstations, each of which includes a system unit, a video display unit and operator input devices such as a keyboard and mouse. The computer 12 also includes a system unit, and may also include a video display unit and operator input devices. A system unit generally includes processing, memory, mass storage devices such as disk and/or tape storage elements and other elements (not separately shown), including network interface elements for interfacing the respective computer system 11(n) or server computer 12 to the communication link 13. A video display unit permits the computer to display processed data and processing status to the user, and an operator input device enable the user to input data and control processing by the computer. The computers 11(n) and 12 transfer information, in the form of messages, through their respective network interface devices among each other over the communication link 13. The communication link 13 interconnecting the client computers 11(n) and server computer 12 in the network 10 may, as is conventional, comprise wires, optical fibers or other media for carrying signals representing information among the computers 11(n) and 12.

In one embodiment, the network 10 is organized in a "client-server" configuration, in which at least one computer, namely, computer 12, operates as a server, and the other computers 11(n) operate as clients. Typically, the servers include large-capacity mass storage devices which can store copies of programs and data which are available for retrieval by the client computers over the communication link 13 for use in their processing operations. From time to time, a client computer system 11(n) may also store data on the server computer 12, which may be later retrieved by it (the client computer that stored the data) or other client computers for use in their processing operations. The server computers may be generally similar to the client computers 11(n), including a system unit, video display unit and operator input devices and may be usable by an operator for data processing operations in a manner similar to a client computer. Alternatively, at least some of the server computers may include only processing, memory, mass storage and network interface elements for receiving and processing retrieval or storage requests from the client computers, and generating responses thereto.

The communication link 13 interconnecting the client computers 11(n) and server computer 12 in the network 10 may, as is conventional, comprise wires, optical fibers or other media for carrying signals representing information among the computers 11(n) and 12. In one embodiment, the communication link 13 includes the Internet, to which the computers 11(n) and 12 through network ports, the public telephony system over modems, or other connection arrangements which are known in the art.

The invention provides a system and method, implemented on network 10, for performing semantic analysis in connection with textual information. In one embodiment, described in connection with the network 10, the server computer 12 obtains textual information from other computers connected in the network 10, which may comprise one or more of the client computers 11(n) and/or other server computers (not shown). After obtaining the textual information, the server computer performs an analysis on the textual information to determine its semantic content and develops a database of the information therefrom. Thereafter, the server computer 12 can respond to database queries concerning the information from the database.

In one specific embodiment, the textual information is in the form of "Web pages" from the "World Wide Web," which is typically accessed over the Internet, and in particular comprise information concerning, for example, characteristics, pricing, availability, address and ordering information and the like for one or a number of products and/or services available from a number of companies which maintain various Web sites on the Internet. The information contained in Web pages from diverse Web sites may be in a variety of formats, and may include other types of product and company information as well. The server computer 12, operating in accordance with the invention, receives copies of the Web pages over the Internet, determines their semantic content to identify and extract, for example, the product and/or service characteristic, pricing, availability and other selected types of information from the Web page information. After the selected types of information have been extracted from a Web page, they maybe loaded into the database.

After the information extracted from a Web page has been loaded into the database, conventional database tools are used to retrieve and process the information, in response to queries that may be provided by an operator operating the server computer 12, or in response to queries provided by operators operating the client computers 11(n) transmitted to the server computer 12 over the communication link 13. For example, if an operator wishes to obtain information such as identification of companies that sell a particular type of product or service, he or she can issue a query to the database identifying the type of product and the particular type of information to be provided (in this example, company identifications), the server computer 12 can retrieve the names of companies that sell the particular type of product for provision to the operator. Similarly, if the operator wishes to obtain information as to descriptions, pricing and other types of information which the system may extract from a Web page, the query can further request the other types of information, and the server computer can also retrieve those types of information for provision to the operator.

In either case, if the operator is local to the server computer 12, it (that is, the server computer 12) can provide the retrieved information to the operator by means of, for example, a video display, printer, or the like which is local to the server computer 12. On the other hand, if the operator is using one of the client computers 11(n), the server computer 12 can transmit the retrieved information to the client computer 11(n) over the communication link 13. When the client computer 11(n) receives the requested information, it may also provide the retrieved information to the operator by means of, for example, a video display, printer or the like which is local to the client computer 11(n). In one particular embodiment, the information provided to the client computers is in the form of a Web page, which may be displayed to the operator by a video display. In that embodiment, as is conventional in connection with a Web page, the operator may also use the Web page to issue a database query to the server computer 12 by using a pointing device (not shown) connected to the client computer 11(n) to select various components of the Web page transmitted by the server computer 12 to the client computer 11(n), by using a keyboard to enter textual responses in dialog boxes in the Web page transmitted by the server computer 12 to the client computer 11(n), or by other conventional means to provide information to the server computer 12 using the Web page. It will be appreciated that the server computer 12 may also make use of Web pages in connection with displaying information to an operator local thereto, and obtaining queries from the operator.

The server computer 12 includes several components, including an input data buffer 20, a token generator 21, a token classifier 22, and a database 23, all of which cooperate to generate the semantic analysis, and a system interface 24. The system interface 24 interfaces the other elements of the server computer to the communication link 13. For example, the system interface 24 retrieves Web pages from other computers on the Internet and provides them to the input data buffer 20 for buffering, after which the Web pages can be processed and analyzed by the token generator 21 and token classifier 22 to extract their semantic content as described below, and the results of the processing and analysis loaded in the database 23. In addition, the system interface 24 can receive queries from the operator and provide information, including Web pages, to the operator, as described above, including both remote operators (that is, operators operating the client computers 11(n)), as well as local operators who may be operating the server computer 12.

The system interface 24 can retrieve Web pages from Web sites using conventional retrieval techniques, using conventional URL's (universal resource locators) as addresses to access the Web sites maintained by various companies. The server computer 12 can be provided with URL's by an operator operating the server computer 12, operating other server computers (not shown) or operating any of the client computers 11(n). In addition, the server computer 12 may be provided with URL's from a variety of other sources, and may also identify URL's contained in retrieved Web pages which point to other Web sites (that is, Web sites other than the Web site from which the Web page was retrieved) and use such URL's to access the other Web sites and retrieve Web pages therefrom.

The input data buffer 20 will receive Web pages from the system interface 24 and buffer them prior to processing by the token generator 21. Each Web page effectively comprises a stream of digital information that includes Web page information, which constitutes the information that will normally be displayed to an operator, along with formatting information indicating how the Web page information is to be displayed. Typically, the Web page information stream is in ASCII form, with the formatting information being delimited by angle brackets, in particular an "<" is provided at the beginning of the formatting information and a ">" is provided after the formatting information. A Web page digital information stream may also include graphical figures in a predetermined graphical information format, with suitable delimiters and positioning information identifying where the figure is to be displayed.

At some point after a Web page is received and placed in the buffer 20, the token generator 21 will parse the digital information stream to identify the respective lexical elements in the information stream, and generate for each lexical element or group of lexical elements one or more tokens that identify the lexical element(s) and its (their) values. In generating the series of tokens from the Web page information stream, the token generator 21 may generate tokens for some or all of the formatting information contained in the Web page digital information stream, since at least some of the formatting information may be useful in identifying the semantic content of the lexical elements preceding or following the formatting elements.

For example, the formatting information may identify certain sections of the Web page information stream as comprising a title, headers of various levels and the like, which can be useful in, for example, identifying various sections into which the information stream may be divided. Web page title information can be useful in determining the semantic content of information contained in the Web page, and the titles of various Web page sections can be useful in determining the semantic content of the respective sections. Similarly, formatting information can be used to identify headings for rows and/or columns for information organized in tables, and the like, all of which can be useful in identifying the type of information contained in the respective rows and/or columns. The token generator 21 will preferably include in the series of tokens generated for a Web page information stream tokens for formatting information that may be useful in determining semantic contact of the information contained in the Web page. However, the token generator 21 need not generate tokens for, for example, formatting which would not be useful in determining semantic content of the Web page information stream. In addition, the token generator 21 need not generate tokens for types of information, such as graphical information, which would not be useful in determining semantic content of the Web page information stream or which would not otherwise be provided in the database. It will be appreciated that, if, for example, graphical information may be stored in the database, either alone or with textual indicia, the token generator 21 may also generate tokens for the graphical information.

In the illustrative embodiment, in which the system provides information concerning characteristics, pricing, availability, address and ordering information and the like for products and/or services available from a number of companies which maintain various Web sites on the Internet, certain of the lexical elements in the Web page information stream may include a text strings that comprise the company name and address, product or service identifiers such as model names or numbers or the like followed by descriptions of characteristics of the products or services identified thereby, and so forth. In addition, the Web page information stream may include textual elements or text string comprising a currency symbol, such as an ASCII dollar sign "$," typically followed by a textual element or text string comprising a number which may include a decimal delimiter comprising pricing information associated with each such product or service or with groups of products or services.

The token classifier 22 receives the series of tokens generated by the token generator 21 and generates from each token a classification therefor. The classification generated by the token classifier 22 will be used to identify one of a predetermined set of attributes to which the token is to be assigned. In the illustrative embodiment in which the system provides information concerning characteristics, pricing, availability, ordering information and the like for products and/or services available from a number of companies which maintain various Web sites on the Internet, the token classifier 22 determines whether each token is to be associated with product or service characteristic information, pricing information, availability information, the identification of the company which is the source of the product or service, ordering information and the like. Thus, the token classifier identifies the particular type, within a predetermined set of types, of information, for each of the tokens.

In one embodiment, the token classifier is in the form of a classification tree. The general classification tree methodology is described in detail in L. Breiman, et al., *Classification and Regression Trees*, (Wadsworth & Brooks/Cole Advanced Books & Software, Pacific Grove, Calif.: 1984) (hereinafter, "Breiman"). As described in Breiman, the methodology provides an arrangement for classifying a "record" (in this case, a token generated by the token generator 21) comprising individual items of data to one of a plurality of predetermined classes based on the value(s) of the particular items of data contained in the record. For each item, the methodology makes use of a set of inquiries applied to the data items comprising the record. First an initial inquiry is applied, and the response to that inquiry provides a basis for selecting a subsequent inquiry. This process is repeated through a series of inquiries until a response to one particular inquiry ends in the identification of a class to which the record is to be assigned. Generally, the series of inquiries applied to a particular record is a subset of the entire set of inquiries that may be applied. If each inquiry is analogized to a node, the set of nodes and their order of application resembles a tree, with the set of classes corresponding to leaves of the tree. Such a tree can be used to perform classification, and will be generally identified herein as a "classification tree." As is described in Breiman, the particular set of inquiries is determined by training using a set of properly classified records.

The token classifier 22 implements an extension of the classification tree methodology described in Breiman, in particular by providing that each inquiry, or "node," in the classification tree is not limited to using the values of the contents for the particular token to be classified, but instead may make use of a plurality of data items which the token can contain, as well as the contents data items of which are in other tokens as well as the classifications determined for previous tokens. Such extensions to the classification tree methodology are generally described in, for example, Marc Goodman, "Projective Visualization: Learning To Simulate From Experience," Ph.D. Thesis, Brandeis University, (UMI Dissertation Services, 1995).

The token classifier 22 generates for each token, a classification that will identify the one of a plurality of predetermined database attributes for the token in the database record for the Web page. As indicated above, the classification tree methodology provides an identification of a classification based on prior training using a training set comprising a number of properly classified tokens. If the token classifier 22 is unable to determine a proper classification for a particular token, an operator, either local to the server computer 12 or controlling the token classifier 22 from a client computer 11(n), may provide a proper classification for the token. Thereafter, the classification tree may be retrained by a classifier maintenance module 25 using the training set expanded by the properly classified token.

After the token classifier 22 generates classifications for the tokens generated for the Web page, it provides the tokens, the tokens' respective classification and the identification of the Web page to the database system 23, which loads the information provided by the token classifier in to the database. In that operation, the database system 23 may generate zero or more database records for the Web page, including an identification of the token and an association of each token with the respective database attribute.

Thereafter, the database system 23 can use the new database records provided loaded by the token classifier, along with other previously-provided database records, to respond to database queries provided by a local or remote operator as described above.

A specific example will help illustrate operations performed by the token generator 21 and the token classifier 22. The example will be described in connection with the following Web page information stream:

Web Page Information Stream (1)<HTML>
(2)<TITLE>
(3) This is a page</title>
(4)<H1>
(5) This is a header</h1>
(6) String
(7) LongString
(8) $
(9) (Number)
(10) LongString
(11) $
(12) (Number)
(13) (continues)
(14)</HTML>

In this illustrative Web page information stream in lines (1) through (14) above, the information in line (1) identifies the information stream as comprising a Web page encoded in the well-known HTML HyperText Markup Language. Line (2) comprises a formatting code that identifies the beginning of a title for the page, and line (3) comprises an ASCII string comprising the title "This is a page" followed by an end-of-title formatting code "</title>". The title may identify, for example, the name and address of the company providing the products and/or services which are described in the Web page information stream.

Following line (3) is another formatting code "<H1>" (line (4)) that identifies the beginning of a first-level header, and the next line (5) comprises an ASCII string comprising the first level header "This is a header" followed by an end-of-first-level-header formatting code "</h1>." The header may identify, for example, a product or service type, in which case the information contained in the Web page information stream following the header will be for the identified type. If the Web page information stream subsequently contains one or more other first-level headers, they may identify respective other product or service types, and the information contained in the Web page information stream following the respective headers will be for the types indicated by the respective headers. The Web page information stream may also include second and lower level headers, indicated by respective formatting codes, which may be used, for example, to indicate respective sub-types or sub-classes of products or services.

Following the first-level header in line (5), the information stream includes a relatively short ASCII string (line 6), followed by a relatively long ASCII string (line 7). The relatively short ASCII string in line (6) may identify, for example, a model or class number for one or more products or services, and the relatively long ASCII string in line (7) may be used to provide a description of a product or service identified in line (6). Following line 7 is a currency indicator, in particular, an ASCII "$" ("dollar sign") (line 8) followed by a number (line 9), which would indicate the price for the product or service described in line (7). Lines 10 through 12 also contain a relatively long ASCII string, a currency indicator and a number, and provide another description and price. The pattern in lines 7 through 9 and lines 10 through 12 may repeat a number of times, as indicated by line (13), providing still further descriptions and respective prices. Following line 13 is a formatting code indicating the end of the Web page.

The token generator 21 will receive the illustrative Web page information stream and generate therefrom the following series of tokens:

Token Series (1) HTML
(2) TITLE
(3) StringPointer→"This is a page"
(4) eTITLE
(5) H1
(6) StringPointer→This is a header
(7) eH1
(8) StringPointer→String
(9) StringPointer→LongString
(10) CurrencyIndicator
(11) NumberPointer→NumberValue
(12) StringPointer→LongString
(13) CurrencyIndicator
(14) NumberPointer→NumberValue
(15) (continues)
(16) eHTML Each token in the token series indicates one type, of a predetermined set of types, of information contained in the various lines of the Web page information stream. For example, the token in line (1), "HTML," is generated from line (1) of the Web page information stream, and identifies the token series as being related to a Web page in the HTML programming language. The token in line (2), "TITLE," is generated from line (2) of the Web page information stream, and indicates the beginning of a title. The token in line (3), "StringPointer," generated from the string in line (3) of the Web page information stream, is a pointer to the ASCII string "This is a page," which corresponds to line (3) of the Web page information stream, and the token in line (4), "eTITLE," generated from the end-of-title formatting code "</title>" in line (3) of the Web page information stream, indicates the end of a title. Thus, the tokens in lines (2) and (4) of the series of tokens identify the token in line (3) "StringPointer" as pointing to a string which constitutes a title.

Similarly, the series of tokens in lines (5) through (7), which are generated from lines (4) and (5) of the Web page information stream, respectively indicate the beginning of a first-level header ("H1"), a string pointer pointing to the ASCII string "This is a header" in line 5 from the Web page information stream, and the end-of-first-level-header formatting code "</h1>" from line 5 of the Web page information stream.

The token in line (8), which is generated from line (6) of the Web page information stream, indicates a string pointer pointing to the ASCII string "String" in line (6) of the Web page information stream.

The token in lines (9) through (11), which are generated from lines (7) through (9) of the Web page information stream, indicate respectively a string pointer to the relatively long ASCII string in line (7) of the Web page information stream, a currency indicator and a pointer to a number in line (9) of the Web page information stream. The tokens in lines (12) through (14), which are generated from lines (10) through (12) of the Web page information stream, provide similar information for the relatively long ASCII string, dollar sign and the number in lines (10) through (12) of the Web page information stream.

In one particular embodiment, the token generator 21 makes use of "FLEX: A Fast Lexical Analyzer Generator," a computer program available from the Free Software Foundation.

Similar series of tokens will be provided to represent the portion of the Web page information stream represented by line (13) of the Web page information stream, as indicated by line (15) of the token series, and finally an end of page indicator token will be provided, as indicated in line (16) of the token series, for the end of page indicator formatting code in line (14) of the Web page information stream.

The series of tokens generated by the token generator 21 will be processed by the token classifier 22 to generate a classification for each of the tokens generated by the token generator 21. The token classifier 22 will generally process the tokens in the series in order to generate a classification for each token. In that operation, the token classifier 22 may skip the tokens which indicate formatting, such as the tokens in lines (1), (2), (4), (5), (7) and (16), but it (that is, the token classifier) will generally make use of the tokens in classifying the other tokens. The particular detailed operations performed by the token classifier 22 will depend on the particular types of information contained in the Web page information stream, and the particular classifications selected for the information, as well as the particular classification methodology that is implemented by the token classifier 22. As described above, in one embodiment the token classifier 22 makes use of a classification tree which can classify each token based on the token's type, classifications generated for previous tokens in the series, and as well as types of subsequent tokens in the series. Thus, for example, in generating classifications for the tokens in lines 9 through 11, the token classifier may use on the fact that the token in line 10 is a currency indicator and that the following number pointer will generally comprise a price and the preceding string will generally comprise a description of a product or service. In any case, after the token classifier 22 generates classifications for each of the tokens, it will provide the pointers to the information and the respective classifications to the database subsystem 23 to be added to its database.

The invention provides a number of advantages. In particular, it provides an arrangement for automatically determining the semantic content of information provided in a variety of formats, and for loading the classified information into a database for future use in connection with queries provided by an operator. The arrangement allows for proper classification of the information with a minimum of intervention or maintenance by an operator, and makes use of "machine learning" capabilities to provide for updating of the classifier as tokens are received which it cannot classify.

It will be appreciated that a number of modifications may be made to the system described herein. For example, although the system has been described in connection with processing of Web pages in the conventional HTML language, it will be appreciated that the system may be used in connection with textual information in other forms. In addition, although the token classifier 22 has been described as classifying tokens using a classification tree, it will be appreciated that other mechanisms can be used in performing the classification. Furthermore, although the token generator 21 has been described as making use of the FLEX computer program, it will be appreciated that other token generating programs and methodologies may be used.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system for receiving an information stream in the form of textual information comprising a series of information elements and generating therefrom respective classifications for said information elements from a plurality of predetermined classifications, said system comprising:

A. a token generator configured to receive the information stream, parse the information stream to identify the respective information elements, identify for each information element one of a plurality of element types, and generate for each information element a token identifying the information element's element type;

B. a token classifier configured to receive the tokens and generate a classification to classify each said token in relation to the element type associated with said respective token, classifications generated for previously-classified tokens and the types of previous and successive tokens, thereby to determine the semantic content of the information associated with the tokens.

2. A system as defined in claim 1 further comprising a database system, the information elements being loaded into the database system according to their respective classifications.

3. A system as defined in claim 1 in which the token classifier includes a trained classification tree.

4. A system as defined in claim 3 in which the trained classification tree is trained using a training set of properly classified tokens.

5. A system as defined in claim 4 further comprising a maintenance module for retraining the classification tree if it determines that a token is incorrectly classified, using the training set expanded by the incorrectly classified token, for which an operator has provided a proper classification.

6. A method of receiving an information stream in the form of textual information comprising a series of information elements and generating therefrom respective classifications for said information elements from a plurality of predetermined classifications, said method comprising the steps of:

A. receiving the information stream, parsing the information stream to identify the respective information elements, identifying for each information element one of a plurality of element types, and generating for each information element a token identifying the information element's element type;

B. generating for each token a classification to classify each said token in relation to the element type associated with said respective token, classifications generated for previously-classified tokens and the types of previous and successive tokens, thereby to determine the semantic content of the information associated with the tokens.

7. A method as defined in claim 6 further comprising the step of loading the tokens into a database system according to their respective classifications.

8. A method as defined in claim 6 in which the token classification step includes use of a trained classification tree.

9. A method as defined in claim 8 includes the step of training the classification tree using a training set of properly classified tokens.

10. A method as defined in claim 9 further comprising the step of retraining the classification tree if the classification tree determines that a token is incorrectly classified, using the training set expanded by the incorrectly classified token, for which an operator has provided a proper classification.

11. A computer program product for controlling a computer to receiving an information stream in the form of textual information comprising a series of information elements and generating therefrom respective classifications for said information elements from a plurality of predetermined classifications, said computer program product comprising a machine-readable medium having encoded thereon:

A. a token generator module configured to enable the computer to receive the information stream, parse the information stream to identify the respective information elements, identify for each information element one of a plurality of element types, and generate for each information element a token identifying the information element's element type;

B. a token classifier module configured to enable the computer to, for each token, generate a classification to classify each said token in relation to the element type associated with said respective token, classifications generated for previously-classified tokens and the types of previous and successive tokens, thereby to determine the semantic content of the information associated with the tokens.

12. A computer program product as defined in claim 11 further comprising a database system module for controlling the computer to load the information elements into a database according to their respective classifications.

13. A computer program product as defined in claim 11 in which the token classifier module includes a trained classification tree.

14. A computer program product as defined in claim 13 in which the trained classification tree is trained using a training set of properly classified tokens.

15. A computer program product as defined in claim 14 further comprising a maintenance module for enabling the computer to retrain the classification tree if it determines that a token is incorrectly classified, using the training set expanded by the incorrectly classified token, for which an operator has provided a proper classification.

* * * * *